United States Patent
Nakamura et al.

(10) Patent No.: US 7,110,348 B2
(45) Date of Patent: *Sep. 19, 2006

(54) OPTICAL INFORMATION RECORDING MEDIUM

(75) Inventors: Naomasa Nakamura, Yokohama (JP); Keiichiro Yusu, Yokohama (JP); Sumio Ashida, Tokyo (JP); Katsutaro Ichihara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/197,498

(22) Filed: Aug. 5, 2005

(65) Prior Publication Data
US 2006/0007846 A1    Jan. 12, 2006

Related U.S. Application Data

(62) Division of application No. 10/102,943, filed on Mar. 22, 2002, now Pat. No. 6,944,116.

(30) Foreign Application Priority Data
Nov. 26, 2001    (JP)    ............................. 2001-359607

(51) Int. Cl.
  *G11B 7/24*    (2006.01)
(52) U.S. Cl. .................. 369/283; 369/288; 369/275.1
(58) Field of Classification Search ................ 369/283, 369/288, 275.1, 275.2, 275.3, 275.4, 280; 428/64.1, 64.4, 64.5, 64.6, 694 EC; 430/270.13
See application file for complete search history.

(56) References Cited

U.S. PATENT DOCUMENTS

| | | | |
|---|---|---|---|
| 6,312,780 B1 | 11/2001 | Kasami et al. | |
| 6,551,679 B1 * | 4/2003 | Kuroda et al. | 428/64.1 |
| 6,667,088 B1 | 12/2003 | Miki | |
| 6,697,323 B1 | 2/2004 | Miki | |
| 6,806,030 B1 * | 10/2004 | Terao et al. | 430/270.13 |
| 6,944,116 B1 * | 9/2005 | Nakamura et al. | 369/283 |

FOREIGN PATENT DOCUMENTS

| | | |
|---|---|---|
| JP | 2000-306271 | 11/2000 |
| JP | 2001-143326 | 5/2001 |
| JP | 2001-167477 | 6/2001 |

* cited by examiner

*Primary Examiner*—Ali Neyzari
(74) *Attorney, Agent, or Firm*—Pillsbury Winthrop Shaw Pittman, LLP (57) ABSTRACT

An optical information recording medium of this invention includes a substrate, a light incident surface, a first reflecting layer formed between the substrate and the light incident surface, a second reflecting layer formed between the first reflecting layer and the light incident surface and stacked on the first reflecting layer, the second reflecting layer being made of the same material as that of the first reflecting layer, and a phase change optical recording layer formed between the second reflecting layer and the light incident surface, the phase change optical recording layer transiting between a crystal state and an amorphous state when irradiated with a light beam.

5 Claims, 5 Drawing Sheets

OPTICAL INFORMATION RECORDING MEDIUM

CROSS-REFERENCE TO RELATED APPLICATIONS

This application is a divisional of U.S. application Ser. No. 10/102,943, filed Mar. 22, 2002, now U.S. Pat. No. 6,944,116 and to which priority is claimed under 35 U.S.C. §121. This application is based upon and claims the benefit of priority under 35 U.S.C. §119 from the prior Japanese Patent Application No. 2001-359607, filed Nov. 26, 2001, the entire contents of both applications are incorporated herein by reference in their entireties.

BACKGROUND OF THE INVENTION

1. Field of the Invention

The present invention relates to an optical information recording medium capable of recording and reproducing large-capacity information using a light beam.

2. Description of the Related Art

Recently, in the field of information recording, research into optical information recording media and optical information recording methods are progressing at various laboratories. Optical information recording media can record/reproduce information in a noncontact state. Optical information recording media are classified into read-only-type, write-once, read-many-type, and rewritable media and can cope with various memory forms. Such optical information recording media can inexpensively store large-capacity files and are expected to be widely used as industrial and consumer devices.

CDs, LDs, and DVDs (Digital Versatile Discs) corresponding to a read-only memory form have already been widely proliferated. These optical disks have a transparent substrate on which a three-dimensional pattern such as pits and grooves that indicate an information signal is formed. A reflecting film formed from a metal thin film of, e.g., aluminum is formed on the transparent substrate. A protective film for protecting the reflecting film from oxidation is formed on the reflecting film. A light beam incident on the optical disk is reflected by the reflecting film. The three-dimensional pattern such as pits and grooves that indicate an information signal is reflected on reflected light reflected by the reflecting film. Hence, when a change in reflected light is detected, the information signal can be reproduced.

Phase change optical disks corresponding to a rewritable memory form are already forming a market of PDs, DVD-RAMs, and DVD-RWs. The disk structure will be described below. A transparent dielectric film is formed on a transparent substrate. A phase change recording layer essentially consisting of Ge, Sb, Te, In, or Ag is formed on the transparent dielectric film. Another transparent dielectric film is formed on the phase change recording layer. A reflecting film made of, e.g., aluminum is formed on the transparent dielectric film. In addition, a protective film made of, e.g., a UV curing resin is formed on the reflecting film. Upon receiving a light beam from a semiconductor laser, the phase change recording layer on the transparent substrate reversibly transits between an amorphous state and a crystal state. In an information reproduction mode, an information signal is reproduced by detecting a change in reflected light from a recording portion of the phase change recording layer. In an information recording mode, a recording portion of the phase change recording layer is irradiated with a short-pulse light beam having a relatively high power to heat the recording portion to a temperature equal to or more than the melting point. Then, the recording portion is quickly cooled to form an amorphous recording mark at the recording portion. In an information erase mode, the recording portion of the phase change recording layer is irradiated with a long-pulse light beam having a lower power than in the recording mode to hold the recording portion at a temperature between the crystallization temperature (inclusive) and the melting point (exclusive) or cool the recording portion from a temperature equal to or more than the melting point, thereby crystallizing the recording portion. As described above, in the phase change optical recording, information is recorded using a change in reflectance between the amorphous state and the crystal state. For this reason, an apparatus can have an optical system with a simple structure. Phase change optical recording requires no magnetic field, unlike magnetooptical recording. Additionally, in phase change optical recording, an overwrite by light intensity modulation is easy, and the data transfer rate is high. Furthermore, phase change optical recording has good compatibility with a read-only disk represented by a DVD-ROM and CD-ROM.

As a method of increasing the capacity of such an optical disk, the NA (Numerical Aperture) of the objective lens of an optical pickup is increased to reduce the spot diameter of reproduction light, thereby attaining a high recording density. In a shift from, e.g., a CD to a DVD, the substrate thickness is decreased from 1.2 mm to 0.6 mm to cope with an optical system with a high NA. To increase the NA, the transparent substrate through which reproduction light passes must be made thinner. This is because when the NA is increased, the allowable amount of aberration generated by the angle of shift of the disk surface from a plane perpendicular to the optical axis of the optical pickup, i.e., the tilt angle becomes small. For this reason, as the NA increases, the transparent substrate must be made thin, and the substrate thickness distribution in the disk must fall within a predetermined range.

For a recording/reproduction optical disk such as a DVD, a light beam becomes incident from the substrate side. That is, a light beam irradiation surface in the reflecting layer is formed on the protective layer. An interface is formed between the reflecting layer and the protective layer. Since the surface of the protective layer is reflected on the light beam irradiation surface in the reflecting layer, an equilibrium is maintained. On the other hand, in a high-NA-compatible optical disk which is applied to an apparatus having an optical pickup with a high-NA lens, layers are formed in an order reverse to that of the above-described conventional optical disk to ensure a tilt margin. In such a high-NA-compatible optical disk, a reflecting layer, second protective layer, phase change recording layer, and first protective layer are formed in this order. For this reason, the surface state of the reflecting layer is reflected on the second protective layer formed on the reflecting layer, the recording layer formed on the second protective layer, and the first protective layer formed on the recording layer. Generally, crystal grains on the surface of the reflecting layer formed from an AL alloy tend to have a large side due to columnar growth unique to a metal thin film. The surface roughness of the reflecting layer also roughens the surface of the recording layer through the second protective layer. A mark recorded on the high-NA-compatible optical disk which aims at increasing density by increasing the NA is finer than a mark recorded on the conventional optical disk. That is, the above-described surface roughness of the recording layer greatly influences the recording/reproduction characteristic of the high-NA-compatible optical disk. More specifically, the surface roughness of the recording layer produces noise in the reproduction mode or causes strain at a mark edge in forming a recording mark. Hence, in a high-NA-compatible optical disk, such surface roughness (three-dimensional pattern) of the reflecting layer is preferably suppressed.

In the conventional optical disk in which a light beam is incident from the substrate surface side, a reflecting layer is divisionally formed for efficient mass production. With the divisional reflecting layer formation, the columnar growth of the reflecting layer is slightly suppressed. However, the surface roughness of the reflecting layer generates noise in the reproduction mode or fluctuates a mark edge at a $\frac{1}{10}$ wavelength or more. For this reason, even the above-described columnar growth suppression by divisional film formation does not suffice in obtaining a satisfactory recording/reproduction characteristic. In the conventional optical disk, an Al-based material is used for the reflecting layer. However, this material readily forms large-size crystal grains and is therefore unsuitable for a high-NA-compatible optical disk in which layers are formed in a reverse order. As a method of reducing the surface roughness of the recording layer of a high-NA-compatible optical disk, a method of inserting a metal undercoat between the reflecting layer and the substrate is proposed in Jpn. Pat. Appln. KOKAI Publication No. 11-327890. However, this method has another problem that the disk manufacturing cost increases because an additional layer is formed.

BRIEF SUMMARY OF THE INVENTION

It is an object of the present invention to provide an optical information recording medium having an excellent recording characteristic.

According to an embodiment of the present invention, there is provided an optical information recording medium comprising a substrate, a light incident surface, a first reflecting layer formed between the substrate and the light incident surface, a second reflecting layer formed between the first reflecting layer and the light incident surface and stacked on the first reflecting layer, the second reflecting layer being made of the same material as that of the first reflecting layer, and a phase change optical recording layer formed between the second reflecting layer and the light incident surface, the phase change optical recording layer transiting between a crystal state and an amorphous state when irradiated with a light beam.

Additional objects and advantages of the present invention will be set forth in the description which follows, and in part will be obvious from the description, or may be learned by practice of the present invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention.

DETAILED DESCRIPTION OF THE INVENTION

An embodiment of the present invention will be described below.

In an optical information recording medium according to an embodiment of the present invention, a light incident surface, transparent cover sheet, protective layer, phase change recording layer (to be referred to as a recording layer hereinafter), reflecting layer, and substrate are formed sequentially from one surface. That is, the reflecting layer is formed on the substrate. A light beam becomes incident from the opposite side of the reflecting layer with respect to the substrate. As the most important point, the reflecting layer is formed from first and second reflecting layers. The first and second reflecting layers are made of the same material.

For the above-described recording layer, a material which transits between a crystal state and an amorphous state upon receiving a light beam and exhibits different optical characteristics between the two states is used. An example of this material is a ternary material such as Ge—Sb—Te or In—Sb—Te. Even when at least one of Co, Pt, Pd, Au, Ag, Ir, Nb, Ta, V, W, Ti, Cr, Zr, Bi, Sn, and the like is added to the material in a very small amount, the recording layer can obtain a satisfactory characteristic. To realize a satisfactory recording/erase characteristic, the thickness of the recording layer is preferably 10 to 20 nm. An average surface roughness Ra is preferably $\frac{1}{50}$ to $\frac{1}{10}$ of the recording layer thickness. When the surface roughness Ra is $\frac{1}{50}$, the surface energy becomes small, and the adhesion between the recording layer and a layer stacked on it decreases. Since the decrease in adhesion deteriorates the repetitive recording characteristic and shortens the storage life, a surface roughness Ra of $\frac{1}{50}$ or less is unsuitable. When the surface roughness Ra is $\frac{1}{10}$ or more, a change in light absorbance along with a local change in film thickness of the recording layer cannot be neglected. This is undesirable because it causes strain in the recording mark edge and lowers the jitter. With the above structure, the recording layer can have a satisfactory characteristic. In addition, the reflectance when the recording layer is in the crystal state becomes lower than that in the amorphous state.

The protective layer in the optical information recording medium according to the embodiment of the present invention mechanically and chemically protects the phase change recording layer. It also serves as an interference film for adjusting the optical characteristic of the optical information recording medium. As the protective layer, a transparent dielectric film having a refractive index of 2.0 to 3.5 and an extinction coefficient of 0 to 0.2 is preferably used. A protective layer material preferably contains at least one of, e.g., Zn—S, Si—O, Si—N, Ti—O. Ge—N, Ta—O, Al—N, Cr—O, and SiC. Especially, a composite material containing Si—O and Zn—S is preferable. These protective layer materials can also have an effect for promoting crystallization of the recording layer. Generally, since the stoichiometric ratio of a thin film material largely changes depending on the process condition, the ratio of component elements is not specified.

The reflecting layer in the optical information recording medium according to the embodiment of the present invention is indispensable to reflect an irradiation light beam and efficiently use the optical energy. The reflecting layer also has an effect of a heat dissipation layer in controlling the heating/cooling process unique to the phase change recording medium.

The reflecting layer in the optical information recording medium according to the embodiment of the present invention is formed from first and second reflecting layers made of the same material to make the surface roughness as small as possible. The first reflecting layer is formed on the substrate. After a predetermined time, the second reflecting layer made of the same material as that of the first reflecting layer is formed on the first reflecting layer. Since thin film formation is temporarily stopped between the first and second reflecting layers to stop crystal growth, growth of any large-size grains can be suppressed. At this time, a time of several seconds suffices between formation of the first reflecting layer and formation of the second reflecting layer. The time is preferably 5 seconds or more. In dividing the reflecting layer, when the number of divisions is changed in accordance with the material of the reflecting layer, the surface roughness can be controlled in more detail. For a material such as an Al-based material which readily causes large-size grain growth, the surface roughness reduction effect can be increased by dividing the reflecting layer into three or four layers. On the other hand, for a material such as Ag-based material with relatively small crystal grains, a sufficient effect can be obtained even by two layers. The surface roughnesses of the protective layer and recording layer formed on the reflecting layer having such a multi-layered structure are essentially small. Hence, the recording/reproduction characteristic represented by a jitter characteristic considerably improves. As described above, only by divisionally forming the reflecting layers in a plurality of steps (only by interrupting the reflecting layer formation process), the roughnesses of the surfaces of the reflecting layer and recording layer can be suppressed. That is, the recording/reproduction characteristic can be improved without increasing the manufacturing cost of the optical information recording medium. The reflecting layer material is preferably an alloy mainly containing Ag, Al, or Au and more preferably an Ag alloy that contains an additive element in 5 at % or less and has an excellent resistance against an environment. The reflecting layer in the optical information recording medium of the present invention preferably has a total thickness of 30 to 200 nm.

The optical information recording medium according to the embodiment of the present invention can easily be discriminated by observing its sectional shape with an electron microscope or the like. For example, when an optical information recording medium using an Al-based reflecting layer according to the present invention is observed with a transmission electron microscope, the first and Al-based reflecting layers are separated from each other.

The respective layers according to the embodiment of the optical information recording medium of the present invention can be formed by a general physical deposition method. The layers can be formed by any film formation method such as RF/DC sputtering, electron beam deposition, resistance heating deposition, or molecular beam epitaxy (MBE). In such a thin film forming method represented by RF sputtering, the film characteristic changes according to the process condition in film formation. For example, a reflecting layer with a small surface roughness is preferably formed at a high growth rate. According to the optical information recording medium of the present invention, the surface roughnesses of the reflecting layer and recording layer can be reduced without forming any additional layer. Hence, the disk performance can be expected to improve.

Example 1 of the optical information recording medium of the present invention will be described below.

The interior of a film forming apparatus was exhausted to $5 \times 10^{-4}$ (Pa) or less. A DC power of 1 kW was applied to an AlTi target to form a 50-nm thick first reflecting layer on a 1.1-mm thick PC substrate. Ten seconds after that, film formation was resumed to form a 50-nm second reflecting layer. That is, AlTi reflecting layers having a total thickness of 100 nm were formed. After that, an information layer was formed by RF magnetron sputtering. That is, an RF power of 1 kW was applied to a ZnS(80)—SiO$_2$(20) target to form a 15-nm protective layer. Subsequently, an RF power of 500 W was applied to a Ge target in a gas mixture atmosphere containing argon and nitrogen to form a 5-nm thick GeN layer. Next, an RF power of 250 W was applied to a Ge$_{40}$Sb$_8$Te$_{52}$ target to form a 15-nm thick phase change recording layer. Subsequently, an RF power of 500 W was applied to a Ge target in a gas mixture atmosphere containing argon and nitrogen to form a 5-nm thick GeN layer. Next, an RF power of 1 kW was applied to a ZnS(80)—SiO$_2$(20) target to form a 50-nm thick protective layer. After that, the information-layer-side surface of the substrate extracted from the film forming apparatus was coated with a UV curing resin. Then, a 0.1-nm thick polycarbonate (PC) cover layer was bonded. The resultant structure was rotated by a spinner to decrease the resin thickness to several μm and irradiated with UV light to cure the resin layer. In this way, a disk A as the optical information recording medium of the present invention was completed. A disk B was prepared by continuously forming AlTi reflecting layers having a total thickness of 100 nm and forming the remaining films under the same conditions and compared with the disk A.

Figure 1:
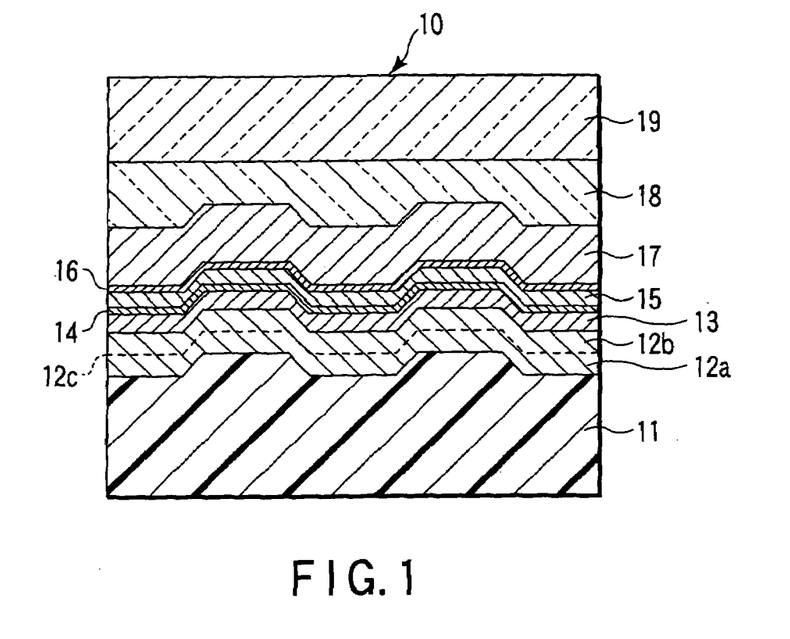
FIG. 1 is a sectional view showing the layer structure of a disk A as an optical information recording medium according to the embodiment of the present invention.

FIG. 1 is a sectional view showing the layer structure of the disk A as the optical information recording medium of the present invention. As shown in FIG. 1, a first AlTi reflecting layer 12a, second AlTi reflecting layer 12b, ZnS(80)—SiO$_2$(20) protective layer 13, GeN layer 14, Ge$_{40}$Sb$_8$Te$_{52}$ recording layer 15, Ge layer 16, ZnS(80)—SiO$_2$(20) protective layer 17, UV curing resin layer 18, and a 0.1-mm thick PC sheet 19 were sequentially stacked on a 1.1-mm thick PC substrate 11 of the disk A. Since the second reflecting layer 12b was formed after the elapse of a predetermined time from formation of the first reflecting layer 12a, a boundary 12c was present between the first reflecting layer 12a and the second reflecting layer 12b. This disk A is irradiated with a light beam from the PC sheet 19 side. That is, the upper surface of the PC sheet 19 serves as a light incident surface 10.

Figure 2:
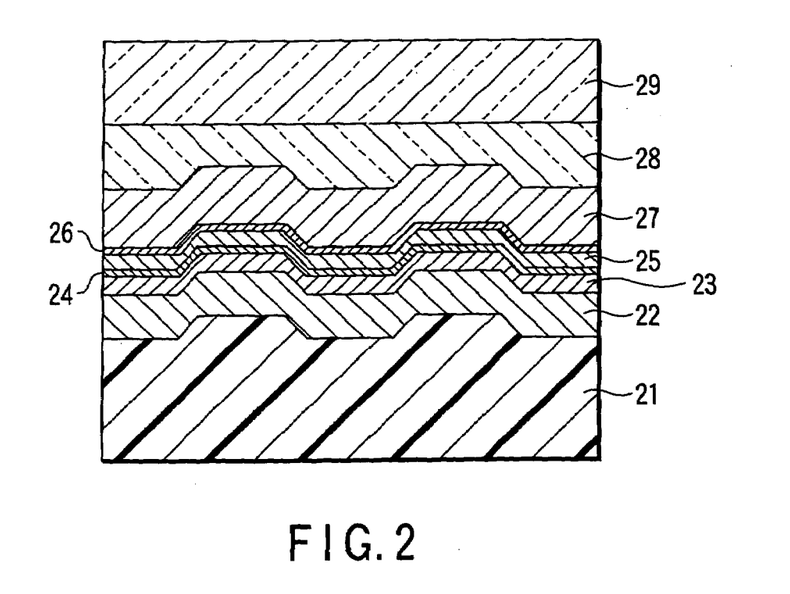
FIG. 2 is a sectional view showing the layer structure of a disk B.

FIG. 2 is a sectional view showing the layer structure of the disk B. As shown in FIG. 2, an AlTi reflecting layer 22, ZnS(80)—SiO$_2$(20) protective layer 23, GeN layer 24, Ge$_{40}$Sb$_8$Te$_{52}$ recording layer 25, GeN layer 26, ZnS(80)—SiO$_2$(20) protective layer 27, UV curing resin layer 28, and 0.1-mm thick PC sheet 29 were sequentially stacked on a 1.1-mm thick PC substrate 21 of the disk B. The reflecting layer 22 in the disk B had no boundary.

AlTi single layer samples a1 and b1 formed on Si substrates in accordance with the same procedure as that for the disks A and B and samples a2 and b2 for which a structure from an AlTi reflecting layer to a Ge$_{40}$Sb$_8$Te$_{52}$ recording layer were formed were prepared.

The AlTi single layer samples a1 and b1 were observed with a transmission electron microscope (TEM). The crystal grain distribution in a plane was observed. The average grain diameter was 34.2 nm for the sample a1 and 51.6 nm for the sample b1. The sections of the samples were observed with the TEM. For the sample a1, a boundary formed by interrupted film formation was clearly observed. This revealed that crystal growth was suppressed. For the sample b1, crystal growth for the substrate reached the surface layer, and a large-size crystal was formed.

Figure 3:
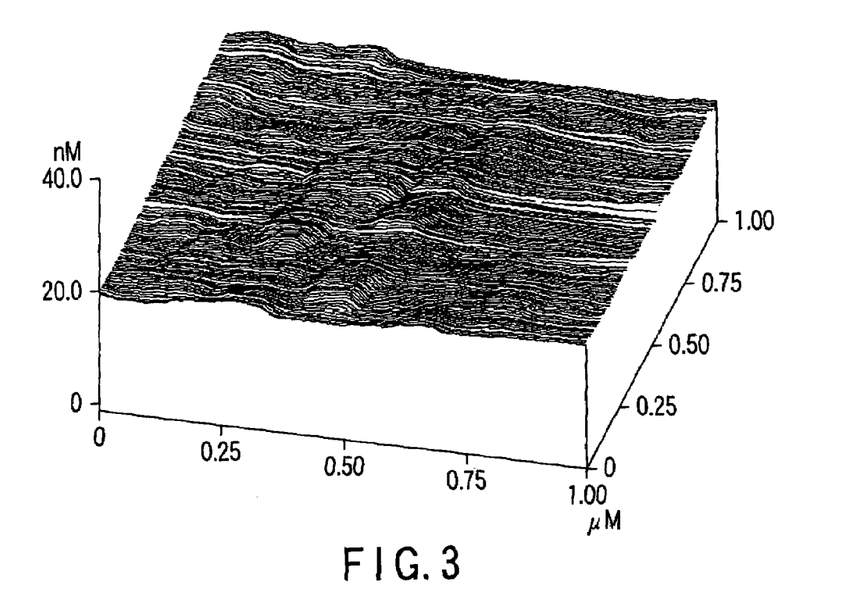
FIG. 3 is a view showing the AFM image of the recording layer surface of a sample a2.
Figure 4:
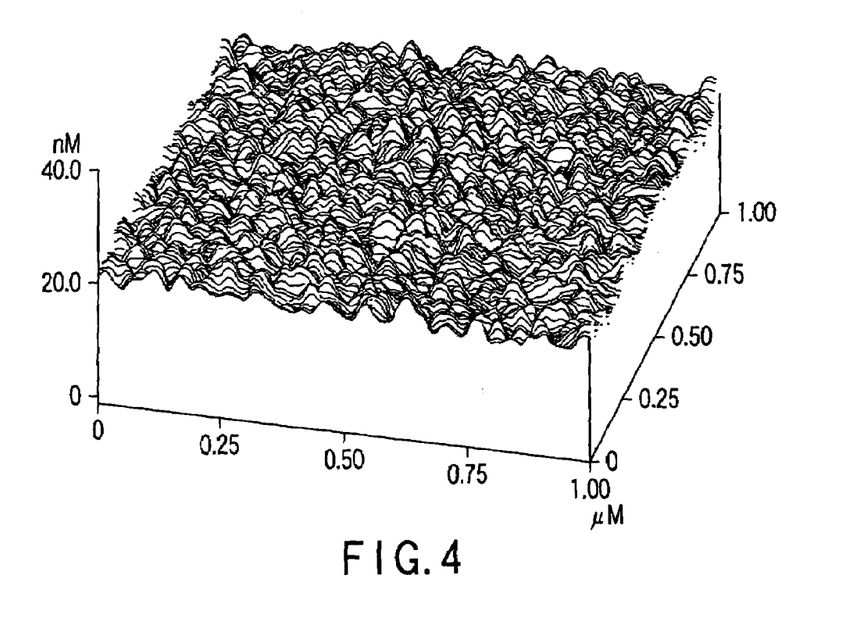
FIG. 4 is a view showing the AFM image of the recording layer surface of a sample b2.

The recording layer surfaces of the samples a2 and b2 were observed with an atomic force microscope (AFM). FIG. 3 is a view showing the AFM image of the recording layer surface of the sample a2. FIG. 4 is a view showing the AFM image of the recording layer surface of the sample b2. The surface of the sample a2 was smooth relative to that of the sample b2. The average surface roughness Ra was 2.7 nm for the sample b2 but 0.8 nm for the sample a2, which exhibited a very satisfactory smoothness. The surface roughness Ra of the sample b2 was ⅒ or more of the recording layer thickness, 15 nm. However, the surface roughness Ra of the sample a2 was ⅒ or less of the recording layer thickness, 15 nm. The influence of the difference in medium structure on the recording/reproduction characteristic was examined. The recording/reproduction characteristics of the disks were evaluated under the following conditions.

| | |
|---|---|
| Laser output | 0.1 to 6.0 mW |
| Light source wavelength | 405 nm |
| Disk rotational speed | 6.0 m/s |
| Objective lens NA | 0.85 |
| Track pitch | 0.30 μm |
| Shortest bit length | 0.12 μm |
| Recording pattern | 3T, 11T |
| Modulation scheme | (8, 16) RLL |

Figure 5:
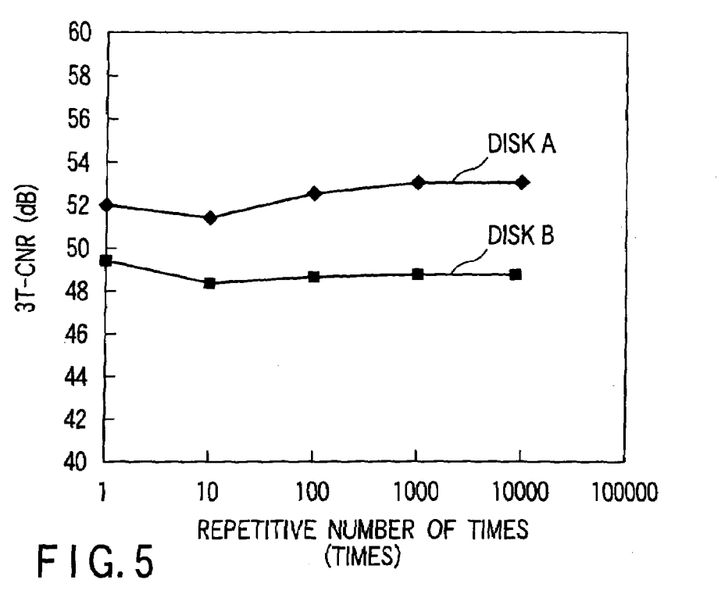
FIG. 5 is a graph showing changes in CNR of closest patterns 3T depending on the repetitive numbers of times of recording of the disks A and B.

FIG. 5 is a graph showing changes in CNR of closest patterns 3T depending on the repetitive numbers of times of recording of the disks A and B. The CNR of the disk A as the optical information recording medium of the present invention maintained a high level of 52 dB or more for 10,000 times. To the contrary, the CNR of the disk B remained 49 dB or less. The CNR of the disk A was high mainly because of low noise. This reflected that the AlTi reflecting layer had fine crystal grains, i.e., the surface roughness of the recording layer was small.

Figure 6:
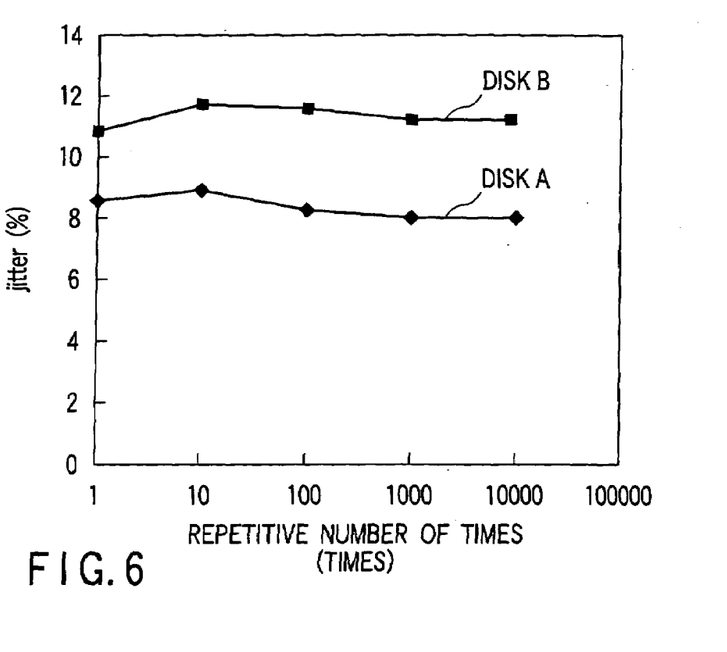
FIG. 6 is a graph showing changes in jitter depending on the repetitive numbers of times of recording of the disks A and B.

FIG. 6 is a graph showing changes in jitter depending on the repetitive numbers of times of recording of the disks A and B. The difference between the disks can be seen from the jitter characteristic shown in FIG. 6. The disk A has a satisfactory jitter value of about 8% while the jitter of the disk B exceeds 11%.

Comparison between the disks A and B proved that the disk A as the optical information recording medium of the present invention had a small three-dimensional pattern on the recording layer and exhibited an excellent jitter characteristic.

Example 2 of the optical information recording medium of the present invention will be described next.

Figure 7:
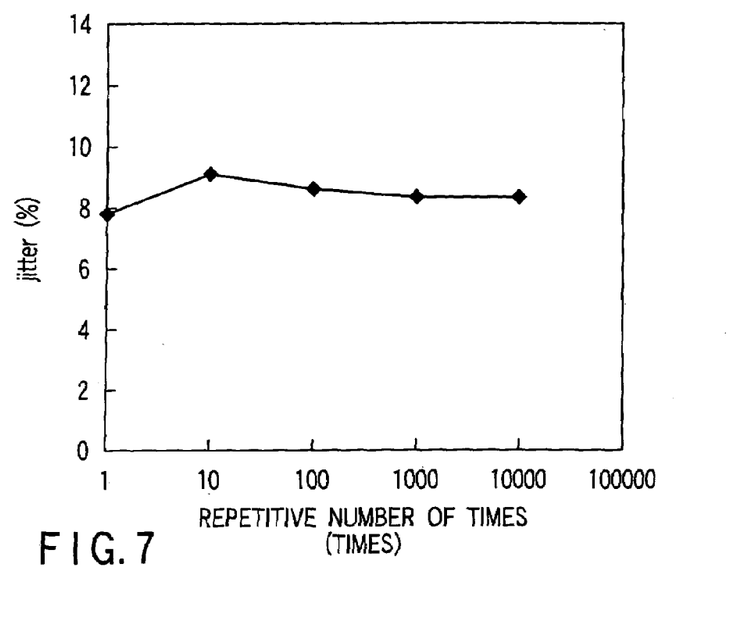
FIG. 7 is a graph showing a change in jitter depending on the repetitive number of times of recording of a disk obtained by replacing the AlTi reflecting layers of the disk A with AgPdCu reflecting layers.

An optical disk was manufactured in accordance with the same procedure and layer structure as in the disk A of Example 1 except that the reflecting layers (first AlTi reflecting layer 12a and second AlTi reflecting layer 12b) were changed to two 25-nm thick AgPdCu layers, i.e., layers having a total thickness of 50 nm. FIG. 7 is a graph showing a change in jitter depending on the repetitive number of times of recording of the disk obtained by replacing the AlTi reflecting layers of the disk A with the AgPdCu reflecting layers. Due to the effect of the AgPdCu reflecting layers having a smaller grain diameter than the AlTi reflecting layers, the jitter characteristic became much better than disk A. A jitter of 8% or less was obtained in repetitive recording of 10,000 times.

Example 3 of the optical information recording medium of the present invention will be described next.

Figure 8:
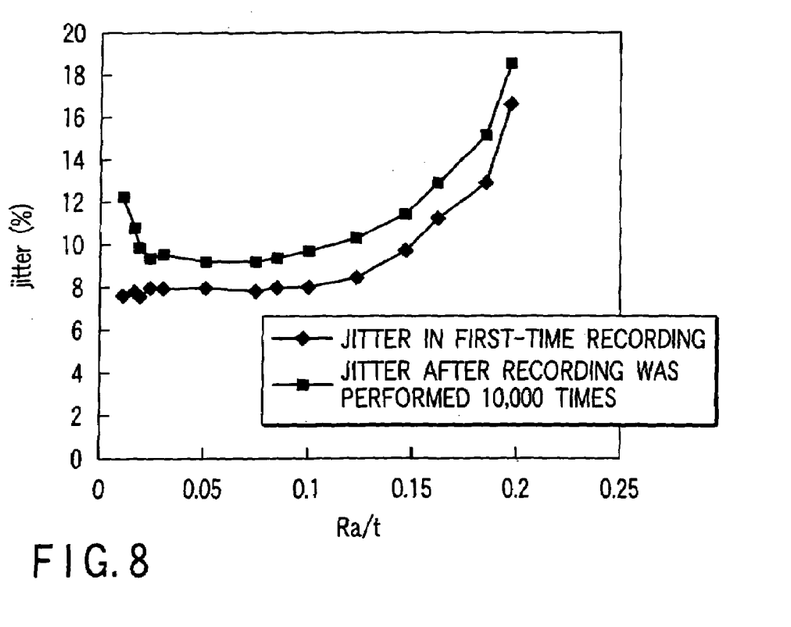
FIG. 8 is a graph showing changes in jitter in a disk obtained by replacing the AlTi reflecting layers of the disk A with an AlMo reflecting layer and, more specifically, the relationship between Ra/t (t is the recording layer thickness) and the jitter in the first-time recording and the relationship between Ra/t and the jitter after recording was performed 10,000 times.

An optical disk was manufactured in accordance with the same procedure and layer structure as in the disk A of Example 1 except that the reflecting layers (first AlTi reflecting layer 12a and second AlTi reflecting layer 12b) were changed to an AlMo reflecting layer. A surface roughness Ra of the recording layer was changed by appropriately changing the number of divisions of the AlMo reflecting layer. The surface roughness Ra was obtained through AFM observation. FIG. 8 is a graph showing changes in jitter in the disk obtained by replacing the AlTi reflecting layers of the disk A with the AlMo reflecting layer and, more specifically, the relationship between Ra/t (t is the recording layer thickness) and the jitter in the first-time recording and the relationship between Ra/t and the jitter after recording was performed 10,000 times. The jitter in the first-time recording exhibited a satisfactory characteristic of about 8% when Ra/t≦0.1. To the contrary, the jitter after recording was executed 10,000 times exhibited an increase not only when Ra/t>0.1 but also when Ra/t≦0.02. That is, a degradation in disk performance was observed. As can be seen from the above results, the ratio of the surface roughness Ra to the recording layer thickness t was appropriately 0.02 to 0.1. As described above, the effect of the present invention was confirmed even in a disk having a different reflectance polarity.

Example 4 of the optical information recording medium of the present invention will be described next.

Figure 9:
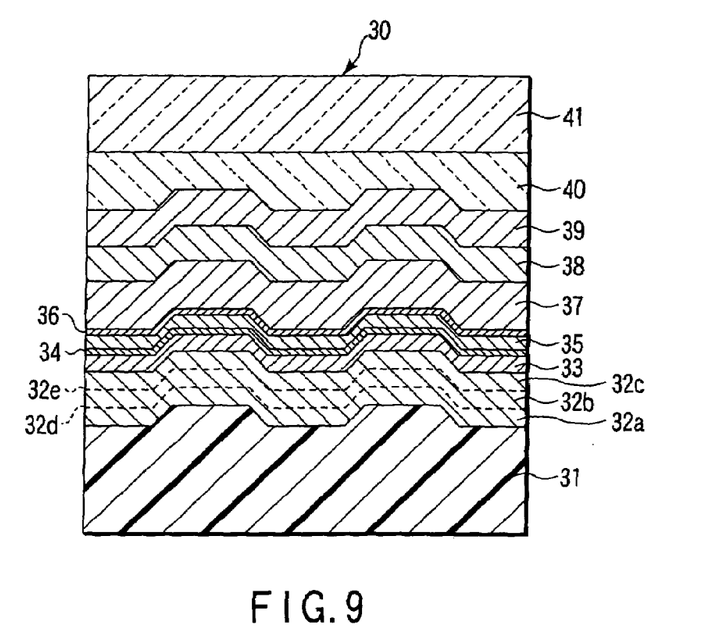
FIG. 9 is a sectional view showing the layer structure of a disk having three protective layers.

As shown in FIG. 9, a disk was manufactured in which AlMo (50 nm*3) (i.e., AlMo (50 nm) reflecting layer 32a, AlMo (50 nm) reflecting layer 32b, and AlMo (50 nm) reflecting layer 32c), ZnS—SiO$_2$ (15 nm) protective layer 33, GeN (5 nm) layer 34, Ge$_{30}$Sb$_{16}$Te$_{54}$ (13 nm) recording layer 35, GeN (5 nm) layer 36, ZnS—SiO$_2$ (20 nm) protective layer 37, SiO$_2$ (60 nm) protective layer 38, ZnS—SiO$_2$ (30 nm) protective layer 39, UV curing resin layer 40, and PC sheet 41 were sequentially stacked on a 1.1-mm thick PC substrate 31. This disk is irradiated with a light beam from the PC sheet 41 side. That is, the upper surface of the PC sheet 41 serves as a light incident surface 30. The AlMo reflecting layer was divided into three layers (32a, 32b, and 32c) at a wait time of, e.g., 6 seconds. AlMo reflecting layers having a total thickness of 150 nm were formed. Section TEM observation showed that the grain growth was interrupted, and two boundaries 32d and 32e were present between the divided portions schematically shown in FIG. 9. The jitter characteristic was evaluated, as in the above examples. The jitter exhibited a satisfactory characteristic that fell within the range of 7.5% to 8.5% for repetitive recording of 10,000 times or more. In Example 4, the reflectance before recording was about 5%, i.e., lower than that after recording. When the reflectance is low, focusing or tracking readily becomes difficult. Especially in a high-NA-compatible medium, this tendency gets stronger by the three-dimensional pattern on the reflecting layer. When the reflecting layer was divided, as in Example 4, stable tracking was obtained even in a disk having such a reflectance polarity.

Example 5 of the optical information recording medium of the present invention will be described next.

Figure 10:
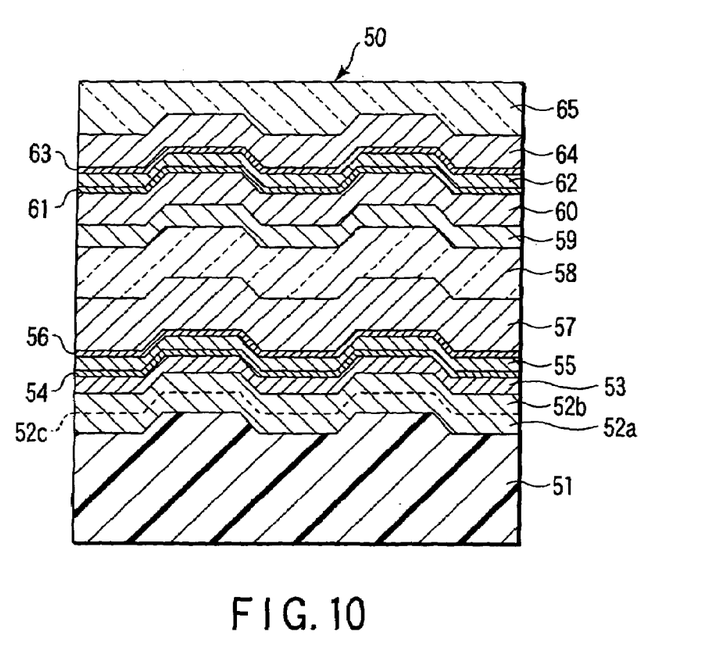
FIG. 10 is a sectional view showing the layer structure of a disk having two recording layers.

As shown in FIG. 10, AlTi (50 nm*2) (i.e., AlTi (50 nm) reflecting layer 52a and AlTi (50 nm) reflecting layer 52b), ZnS—$SiO_2$ (30 nm) protective layer 53, GeN (3 nm) layer 54, second $Ge_2Sb_2Te_5$ (13 nm) recording layer 55, GeN (3 nm) layer 56, and ZnS—$SiO_2$ (90 nm) protective layer 57 were sequentially formed on a 1.1-mm thick PC substrate 51 by sputtering. The AlTi reflecting layer was divided into two layers (52a and 52b) at a wait time of, e.g., 8 sec. AlTi reflecting layers having a total thickness of 100 nm were formed. Parallelly, a ZnS—$SiO_2$ (30 nm) protective layer 64, GeN (2 nm) layer 63, first $Ge_{40}Sb_8Te_{52}$ (6.5 nm) recording layer 62, GeN (2 nm) layer 61, ZnS—$SiO_2$ (25 nm) protective layer 60, and AgPdCu (10 nm) layer 59 were sequentially formed by sputtering on a 0.1-mm thick PC sheet 65 having the same track shape as that of the PC substrate 51. The film surfaces of the two media were bonded via a 30-μm thick UV curing resin layer 58. In such an optical disk having two recording layers, a light beam incident from a light incident surface 50 is independently focused on the first and second recording layers to allow recording/reproduction on the respective layers. Hence, the capacity of the disk can be increased. Section TEM observation showed that the grain growth was interrupted, and a boundary 52c was present between the AlTi reflecting layers schematically shown in FIG. 10. The jitter characteristic was evaluated. The jitter exhibited a satisfactory characteristic that fell within the range of 8.5% to 9.0% in the first recording layer and the range of 7.5% to 8.0% in the second recording layer for repetitive recording of 10,000 times or more. Especially in the second recording layer, a smaller jitter was obtained, and the effect was confirmed.

As has been described above in detail, an excellent jitter characteristic can be obtained using the optical information recording medium according to the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical information recording medium comprising:
   a substrate;
   a light incident surface;
   a first reflecting layer formed between said substrate and said light incident surface;
   a second reflecting layer formed between said first reflecting layer and said light incident surface and stacked on said first reflecting layer, said second reflecting layer being made of the same material as that of said first reflecting layer; and
   a phase change optical recording layer formed between said second reflecting layer and said light incident surface, said phase change optical recording layer transiting between a crystal state and an amorphous state when irradiated with a light beam,
   wherein an average surface roughness Ra of said recording layer is 1/50 to 1/10 (both inclusive) of a thickness of said recording layer, and
   wherein said first reflecting layer and said second reflecting layer have a total thickness of 30 to 200 nm.

2. An optical information recording medium comprising:
   a substrate;
   a light incident surface;
   a first reflecting layer formed between said substrate and said light incident surface;
   a second reflecting layer formed between said first reflecting layer and said light incident surface and stacked on said first reflecting layer, said second reflecting layer being made of the same material as that of said first reflecting layer; and
   a phase change optical recording layer formed between said second reflecting layer and said light incident surface, said phase change optical recording layer transiting between a crystal state and an amorphous state when irradiated with a light beam,
   wherein said first and second reflecting layers contain an Ag alloy, and
   wherein said first reflecting layer and said second reflecting layer have a total thickness of 30 to 200 nm.

3. An optical information recording medium comprising:
   a substrate;
   a light incident surface;
   a first reflecting layer formed between said substrate and said light incident surface;
   a second reflecting layer formed between said first reflecting layer and said light incident surface and stacked on said first reflecting layer, said second reflecting layer being made of the same material as that of said first reflecting layer;
   a phase change optical recording layer formed between said second reflecting layer and said light incident surface, said phase change optical recording layer transiting between a crystal state and an amorphous state when irradiated with a light beam; and
   a protective layer formed between said phase change recording layer and said light incident surface and formed from three layers,
   wherein said first reflecting layer and said second reflecting layer have a total thickness of 30 to 200 nm.

4. An optical information recording medium comprising:
   a substrate;
   a light incident surface;
   a first reflecting layer formed between said substrate and said light incident surface;
   a second reflecting layer formed between said first reflecting layer and said light incident surface and stacked on said first reflecting layer, said second reflecting layer being made of the same material as that of said first reflecting layer; and a phase change optical recording layer formed between said second reflecting layer and said light incident surface, said phase change optical recording layer transiting between a crystal state and an amorphous state when irradiated with a light beam, wherein said phase change recording layer includes a plurality of recording layers capable of independently recording/reproduction, and wherein said first reflecting layer and said second reflecting layer have a total thickness of 30 to 200 nm.

5. An optical information recording medium comprising:
a substrate;
a light incident surface;
a first reflecting layer formed between said substrate and said light incident surface;
a second reflecting layer formed between said first reflecting layer and said light incident surface and stacked on said first reflecting layer, said second reflecting layer being made of the same material as that of said first reflecting layer; and a phase change optical recording layer formed between said second reflecting layer and said light incident surface, said phase change optical recording layer transiting between a crystal state and an amorphous state when irradiated with a light beam, wherein said plurality of recording layers are isolated from each other by intermediate layers, and wherein said first reflecting layer and said second reflecting layer here a total thickness of 30 to 200 nm.

* * * * *